US010924390B2

(12) United States Patent
LaVigne et al.

(10) Patent No.: US 10,924,390 B2
(45) Date of Patent: Feb. 16, 2021

(54) UPDATING ENTRIES OF A DISTRIBUTION DATA STRUCTURE

(71) Applicant: HEWLETT PACKARD ENTERPRISE DEVELOPMENT LP, Houston, TX (US)

(72) Inventors: Bruce E. LaVigne, Roseville, CA (US); Freddy Andrey Solano Ocampo, Heredia (CR); Alonso Jose Carvajal Rojas, Heredia (CR); Claudio Enrique Viquez Calderon, Heredia (CR); Sergio Jesus Guillen Hernandez, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 76 days.

(21) Appl. No.: 16/178,727

(22) Filed: Nov. 2, 2018

(65) Prior Publication Data
US 2020/0145325 A1 May 7, 2020

(51) Int. Cl.
H04L 12/709 (2013.01)
H04L 12/751 (2013.01)
H04L 12/803 (2013.01)
H04L 12/937 (2013.01)

(52) U.S. Cl.
CPC ............ H04L 45/245 (2013.01); H04L 45/02 (2013.01); H04L 47/125 (2013.01); H04L 49/253 (2013.01)

(58) Field of Classification Search
CPC ..... H04L 45/245; H04L 47/125; H04L 45/02; H04L 49/253; H04L 41/12; H04L 45/125; H04L 45/20; H04L 45/38; H04L 45/22; H04L 45/28; H04L 41/0654
See application file for complete search history.

(56) References Cited

U.S. PATENT DOCUMENTS

| | | | |
|---|---|---|---|
| 7,606,161 B2 | 10/2009 | Kalkunte et al. | |
| 7,697,432 B2 | 4/2010 | Yu et al. | |
| 7,903,654 B2 | 3/2011 | Bansal et al. | |
| 8,355,328 B2 | 1/2013 | Matthews et al. | |
| 9,246,821 B1 | 1/2016 | Li et al. | |
| 1,002,757 A1 | 7/2018 | Fedyk et al. | |
| 10,374,945 B1* | 8/2019 | Dhanabalan | H04L 65/4015 |
| 2014/0269260 A1* | 9/2014 | Xue | H04L 41/12 370/225 |

(Continued)

OTHER PUBLICATIONS

Bell Labs, Alcatel-Lucent, Distributed Dynamic Load Balancing in Wireless Networks, 2007-06, pp. 1-15, Retrieved from the Internet Aug. 24, 2018 from URL: <pure.tue.nl/ws/files/1944584/Metis204594.pdf >.

(Continued)

Primary Examiner — Dady Chery
(74) Attorney, Agent, or Firm — Trop, Pruner & Hu, P.C.

(57) ABSTRACT

In some examples, a system populates a distribution data structure useable by a switch in distributing communications of data packets across a plurality of network paths for the switch. In response to an addition of a new network path or a removal of an existing network path for the switch, the system updates entries of the distribution data structure using a process that identifies selected entries of the distribution data structure to skip as part of updating the distribution data structure.

17 Claims, 8 Drawing Sheets

(56) References Cited

U.S. PATENT DOCUMENTS

2015/0163144 A1    6/2015   Koponen et al.

OTHER PUBLICATIONS

Netgear, What are Link Aggregation Groups (LAGs) and how do they work with my managed switch? 2016 (5 pages).
Wikipedia, Equal-cost multi-path routing last edited Jun. 7, 2018 (2 pages).
Wikipedia, Link aggregation last edited Sep. 29, 2018 (13 pages).

* cited by examiner

FIG. 4A

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |

FIG. 4B

| 2 | 2 | 2 | 2 | 2 | 2 | 2 | 2 | 2 | 2 | 2 | 2 | 2 | 2 | 2 |
|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |

FIG. 4C

| 3 | 3 | 3 | 3 | 3 | 3 | 3 | 3 | 3 | 3 | 3 | 2 | 2 | 2 | 2 |
|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 1 | 1 | 1 | 1 |
| 1 | 1 | 1 | 1 | 1 | 1 | 1 | 1 | 1 | 1 | 1 | 1 | 1 | 1 | 1 |

FIG. 4D

| 4 | 4 | 4 | 4 | 4 | 4 | 3 | 3 | 3 | 3 | 3 | 4 | 4 | 4 | 4 |
|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 4 | 4 | 4 | 4 |
| 1 | 1 | 1 | 1 | 1 | 1 | 1 | 1 | 1 | 1 | 1 | 1 | 1 | 1 | 1 |

FIG. 4E

| 1 | 1 | 1 | 1 | 1 | 2 | 3 | 3 | 3 | 3 | 3 | 2 | 2 | 2 | 3 |
|---|---|---|---|---|---|---|---|---|---|---|---|---|---|---|
| 2 | 2 | 2 | 2 | 2 | 2 | 2 | 2 | 2 | 2 | 2 | 2 | 2 | 2 | 2 |
| 3 | 3 | 3 | 3 | 3 | 3 | 3 | 3 | 3 | 3 | 3 | 3 | 3 | 3 | 3 |
| 1 | 1 | 1 | 1 | 1 | 1 | 1 | 1 | 1 | 1 | 1 | 1 | 1 | 1 | 1 |

UPDATING ENTRIES OF A DISTRIBUTION DATA STRUCTURE

BACKGROUND

A switch can refer to a network device that transfers data packets to network paths in a network. In response to receiving a data packet, the switch can select a network path from among multiple network paths over which the received data packet is to be transferred. The selection of the network path can be based on use of forwarding information accessible by the switch.

BRIEF DESCRIPTION OF THE DRAWINGS

Some implementations of the present disclosure are described with respect to the following figures.

FIGS. 4A-4E illustrate example entries of an offset table updated according to some examples.

Figure 1:
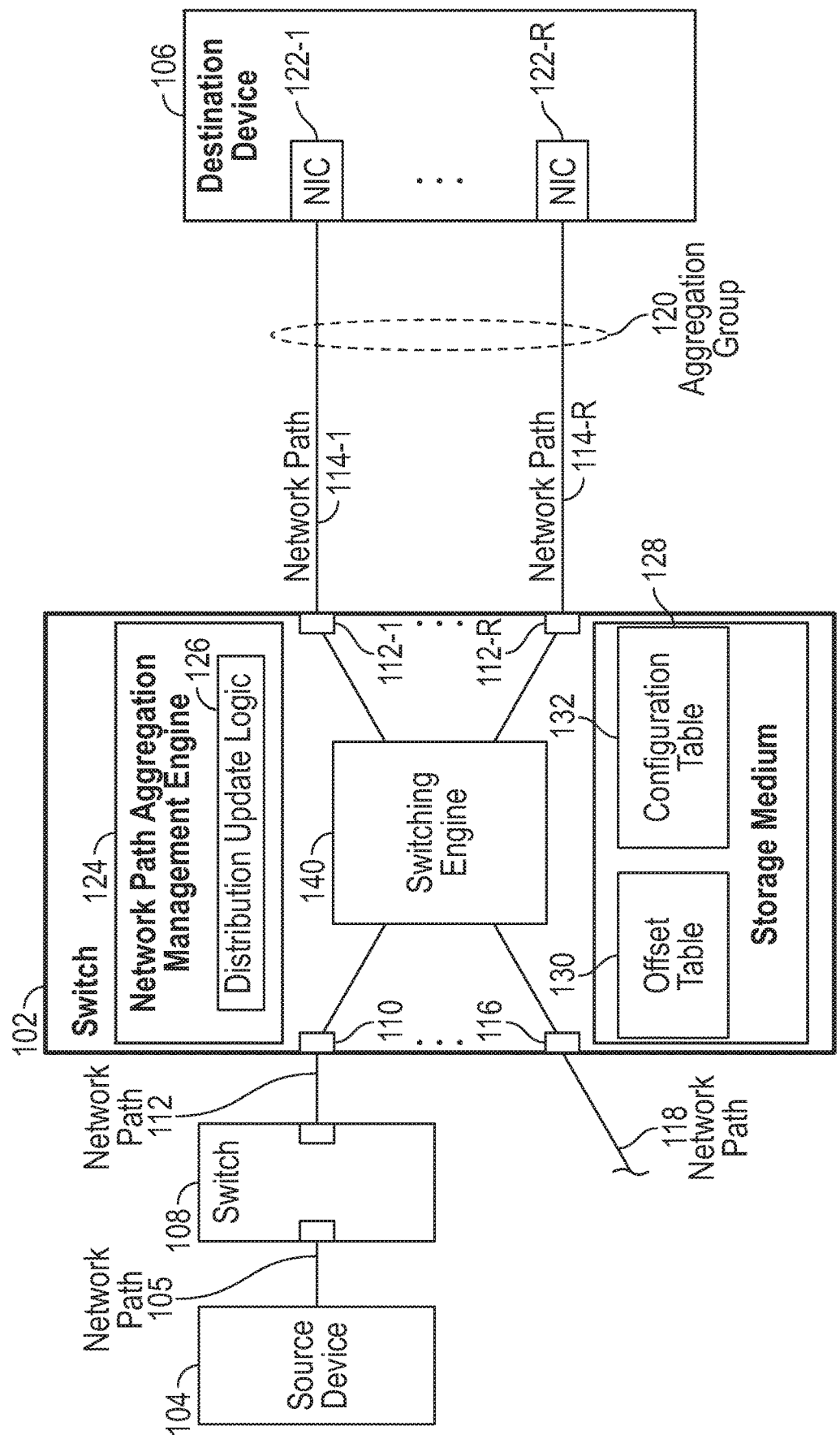
FIG. 1 is a block diagram of a network arrangement according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A switch used to transfer data packets to network paths can include a network device that performs the transfer at any of multiple communication layers (e.g., layer 2, layer 3, etc.). Layer 2 refers to a data link layer, and network path selection performed by a layer 2 switch can be based on layer 2 network addresses, such as Medium Access Control (MAC) addresses, and possibly other fields of data packets. Layer 3 refers to a network layer, and network path selection performed by a layer 3 switch (also referred to as a "router") can be based on layer 3 network addresses, such as Internet Protocol (IP) addresses, and possibly other fields of data packets.

When the switch receives a data packet, the switch uses information from selected fields of the data packet (e.g., a network address field, a port field, etc.) to retrieve an entry of forwarding information (e.g., a forwarding table, a routing table, etc.). The retrieved entry includes information that the switch uses to transfer the data packet to a selected network path of multiple network paths connected to the switch. In other examples, additional or alternative information can be used by the switch to decide the selected network path to which the data packet is to be forwarded; such additional or alternative information can include a port at which the data packet was received by the switch, a time when the data packet was received by the switch, and so forth.

To enhance bandwidth and reliability of network communications, network path aggregation can be performed. Network path aggregation defines an aggregation of network paths (or equivalently, "links") that the switch can use to transfer data packets between a source device (or multiple source devices) and a destination device (or multiple destination devices). The network paths of the aggregation of network paths can include physical network paths or virtual network paths. Bandwidth can be increased by balancing the load associated with communications of data packets across the network paths of the aggregation of network paths. Reliability can be enhanced by using another network path of the aggregation of network paths in response to a fault or error of a network path of the aggregation of network paths.

Examples of techniques that allow for aggregation of network paths include any of the following: Equal-Cost Multipath Routing (ECMP) (e.g., the version of ECMP described by the Institutes of Electrical and Electronics Engineers (IEEE) 802.1Q-2014), Link Aggregation Control Protocol (LACP) (e.g., the version described by IEEE 802.1AX or any proprietary LACP versions used by different vendors), and so forth.

Although reference is made to using aggregation of network paths in some examples, it is noted that techniques or mechanisms according to some implementations of the present disclosure can be used in contexts where aggregation of network paths is not employed.

A switch can include or have access to a distribution data structure used by the switch for distributing communications of data packets across multiple network paths of an aggregation group. The distribution data structure can include entries that contain pointers referencing values that correspond to respective network paths. A "pointer" includes a reference value that indicates a location of another value.

In some specific examples, the distribution data structure includes an offset table that has entries containing pointers to entries of a configuration table. Each entry of the offset table includes a pointer to a respective entry of the configuration table. Each entry of the configuration table includes information representing a network path for a switch.

Network paths can be added to or removed from an aggregation group for the switch. The switch includes ports that connect to respective network paths. A "port" can refer to any interface (physical interface or logical interface) of the switch that is able to communicate over a respective network path. Some network paths can be considered "valid" network paths, while other network paths can be considered "invalid" network paths. The switch can transfer a data packet to a valid network path, while the switch cannot transfer a data packet to an invalid network path. Adding a network path to a switch can refer to adding a valid network path to the aggregation group for use by the switch, or otherwise designating a network path as useable by the switch for data communications in the aggregation group. Removing a network path can refer to indicating the network path as invalid in the aggregation group, or otherwise removing the network path from being useable by the switch for data communications in the aggregation group.

In response to an addition or removal of a network path, the distribution data structure is updated. In examples where the distribution data structure includes an offset table that refers to a configuration table, both the offset table and the configuration table are updated in response to the addition or removal of a network path.

In some examples, updating the distribution data structure involves rebalancing the entire distribution data structure. Rebalancing the entire distribution data structure refers to considering all of the entries of distribution data structure for update in response to the addition or removal of a network path. Rebalancing the entire distribution data structure can lead to a large number of entries (or even all of the entries) of the distribution data structure being changed. Changing an entry of the distribution data structure leads to a transfer of a data communication flow associated with the updated entry to a different network path. Transferring a data communication flow from a first network path to a different second network path may cause a transitory change in the ordering of data packets received at a destination device, which may be different from an order expected by the destination device. In some examples, the misordering of data packets can occur due to different depth of buffering on the different paths within the network. Note that the original order expected by the destination device is the order that was transmitted by a source device.

Changing the ordering of data packets can cause the destination device to assume that some data packets were missed by the destination device, which can request a re-transmission of the missing data packets. The re-transmission of data packets is associated with overhead that consumes bandwidth of the network and processing and storage resources of devices, and thus is to be avoided where possible. In other examples, changing the ordering of data packets can cause additional delay or buffering in the destination device, which is undesirable.

Examples disclosed herein address these technological challenges by updating a distribution data structure (e.g., in response addition or removal of a network path) in a manner that reduces (e.g., minimizes) the number of entries of the distribution data structure that are changed. Reducing the number of entries of the distribution data structure that are changed in response addition or removal of a network path is accomplished by identifying selected entries of the distribution data structure that may be skipped during the update of the distribution data structure.

FIG. 1 is a block diagram of an example network arrangement that includes switches 102 and 108, a source device 104, and a destination device 106. The source device 104 can send data packets to the destination device 106 through the switches 108 and 102. In some examples, the source and destination devices 104 and 106 can also be switches. Each of the switches 102 and 108, the source device 104, and the destination device 106 can include a device with a respective processing resource. A processing resource can include a hardware processing circuit. A "hardware processing circuit" can include any or some combination of a microprocessor, a core of a multi-core microprocessor, a microcontroller, a programmable integrated circuit (e.g., an application specific integrated circuit (ASIC), etc.), a programmable gate array (e.g., field-programmable gate array (FPGA), etc.), a digital signal processor, or another hardware processing circuit. Alternatively, a processing resource can include a combination of a hardware processing circuit and machine-readable instructions (software and/or firmware) executable on the hardware processing circuit. The machine-readable instructions may be stored on a storage medium, as discussed herein.

In the example of FIG. 1, a data packet from the source device 104 is transferred through the switch 108 and then through the switch 102 to the destination device 106. In a different example, there can just be one switch between the source device 104 and the destination device 106, or there can be more than two switches between the source device 104 and the destination device 106. For example, another switch can be coupled between the switch 102 and the destination device 106.

Also, although the example of FIG. 1 refers to the device 104 as a source device and the device 106 as a destination device, it is noted that in a different example, the device 106 can send packets to the device 104, in which case the device 106 is a source device and the device 104 is a destination device.

A link between each pair of devices shown in FIG. 1, where a device can include a source device, a destination device, or a switch, is referred to as a "network path." A physical network path can be implemented using an electrical communication medium (including electrical wires), an optical communication medium (including optical fibers or waveguides), or a wireless communication medium. Each switch has multiple ports that connect to respective network paths. Also, a network path can include a virtual network path, including, as examples, a set of neighbor routers (e.g., a set of layer 3 interfaces), or a set of tunnels (e.g., IP tunnels, Multiprotocol Label Switching (MPLS) tunnels, Virtual Extensible Local Area Network (VxLAN) tunnels, etc.), or other virtual network paths.

The source device 104 is connected by a network path 105 to the switch 108.

The switch 102 has a port 110 that is connected to an input network path 112 (from the perspective of the example given in FIG. 1 where the source device 104 is the transmitting device and the destination device 106 is the receiving device of data packets). The network path 112 connects the switches 108 and 102. The switch 102 further includes ports 112-1 and 112-R that are connected to respective network paths 114-1 to 114-R, where R is ≥2. Thus, in some examples, the switch 102 may have ports 112-2 and 112-3 that are connected to network paths 114-2 and 114-3, respectively. The switch 102 also has another port 116 connected to another network path 118.

The network paths 114-1 to 114-R can be part of an aggregation group 120. The aggregation group 120 includes a group of network paths that are used for communication data of the communication flow from the switch 102 to the destination device 106. In other examples, the network paths 114-1 to 114-R that are part of the aggregation group 120 can connect the switch 102 to another switch. Accordingly, in examples where R is equal to 3, aggregation group 120 may have three network paths. By using the aggregation group 120 for a communication flow, throughput can be increased by load balancing the transfer of data packets for the communication flow between the switch 102 and the destination device 106 across the multiple network paths 114-1 to 114-R of the aggregation group 120. Also, in some examples, the network paths 114-1 and 114-R in the aggregation group 120 can provide redundancy, since a fault on a network path (due to a fault in the switch 102, a fault in the destination device 106, or a fault in the link that makes up the network path), can cause the switch 102 to fail over from the faulty network path to a different network path of the aggregation group 120 for continued communication of data packets in the communication flow.

In some examples, the aggregation group 120 can be defined according to any of the following protocols: LACP, ECMP, and so forth.

The destination device 106 includes network interface controllers (NICs) 122-1 to 122-N that connect to respective network paths 114-1 to 114-R of the aggregation group 120. A NIC can refer to a physical controller of the destination device 106 that performs data communications, or a virtual controller that performs data communications.

The switch 102 includes a switching engine 140 that transfers a data packet received at one port to another port (or multiple other ports). As used here, an "engine" can refer to a hardware processing circuit. Alternatively, an "engine" can refer to a combination of a hardware processing circuit and machine-readable instructions (software and/or firmware) executable on the hardware processing circuit. The machine-readable instructions may be stored on a storage medium, as discussed herein.

The switching engine 140 can route data packets between ports based on use of offset table 130 and configuration table 132 (discussed further below).

The switch 102 also includes a network path aggregation management engine 124 that manages aggregation groups that include respective groups of network paths between the switch 102 and various other devices. For example, the network path aggregation management engine 124 can implement LACP, ECMP, or any other protocol that uses aggregation groups of network paths.

The network path aggregation management engine 124 includes a distribution update logic 126 according to some implementations of the present disclosure. As used here, the distribution update logic 126 can be implemented using a portion of the hardware processing circuit of the network path aggregation management engine 124, or can be implemented using machine-readable instructions executable on the network path aggregation management engine 124. In other examples, the distribution update logic 126 can be separate from the network path aggregation management engine 124. The distribution update logic 126 being "separate" from the network path aggregation management engine 124 can refer to the distribution update logic 126 being part of a first program (code including machine-readable instructions) and the network path aggregation management engine 124 being part of a second, different program (code including machine-readable instructions), or alternatively, can refer to the distribution update logic 126 and the network path aggregation management engine 124 being implemented using different hardware components, e.g., separate processors, computers, etc.

The distribution update logic 126 manages the update of distribution data structures stored in a storage medium 128 that is accessible by the switch 102. The distribution data structures include an offset table 130 and a configuration table 132 in some examples. The storage medium 128 can be implemented using a memory device (or multiple memory devices) and/or a storage device (or multiple storage devices). The storage medium 128 can be part of the switch 102 or can be external of the switch 102 but accessible by the switch 102.

The distribution update logic 126 is able to update the offset table in a manner that seeks to reduce the number of entries of the offset table 130 that are updated in response to the addition of a network path to the aggregation group 120 or the removal of a network path from the aggregation group 120.

Although FIG. 1 shows the network path aggregation management engine 124 and the distribution update logic 126 as being part of the switch 102, it is noted that in other examples, the network path aggregation management engine 124 and/or the distribution update logic 126 can be implemented in a controller that is separate from the switch 102, such as in a Software-Defined Networking (SDN) controller.

Figure 2:
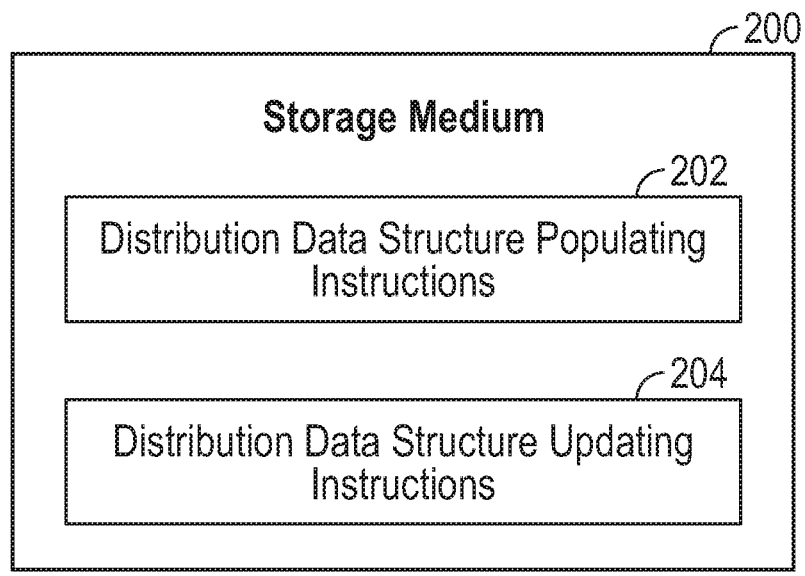
FIG. 2 is a block diagram of a storage medium storing machine-readable instructions according to some examples.

FIG. 2 depicts an example where certain aspects of the network path aggregation management engine 124 and the distribution update logic 126 are implemented using machine-readable instructions. As shown in FIG. 2, a non-transitory machine-readable or computer-readable storage medium 200 stores machine-readable instructions that upon execution by a hardware processing unit (e.g., microprocessor) cause a system (such as the switch 102 of FIG. 1 or a separate controller that is separate from the switch 102) to perform various tasks. The machine-readable instructions include distribution data structure populating instructions 202 to populate a distribution data structure useable by a switch (e.g., 102) in distributing communications of data packets across multiple network paths (e.g., 114-1 to 114-N of the aggregation group 120) for the switch. The distribution data structure populating instructions 202 can include instructions of the network path aggregation management engine 124.

In some examples, the distribution data structure populating instructions 202 are executable to receive configuration information from a controller or a user (such as a network administrator). The controller or user can define aggregation groups that are to be formed for communication of data or different communication flows between devices. The configuration information includes identifiers of the aggregation groups and identifiers of network paths that are part of the aggregation groups. This configuration information is used to populate the entries of the offset table 130 and the configuration table 132.

The storage medium 200 further includes distribution data structure updating instructions 204 that are executable to, in response to an addition of a new network path (e.g., to the aggregation group 120) or a removal of an existing network path (e.g., from the aggregation group 120) for the switch, identify selected entries of the distribution data structure to skip, and update entries of the distribution data structure, where the selected entries are skipped in the updating. In some examples, the distribution data structure includes the offset table 130 shown in FIG. 1.

Identifying selected entries of the distribution data structure to skip as part of updating the distribution data structure involves the distribution data structure updating instructions 204 not considering the selected entries of the distribution data structure for update when the instructions are executed to update the distribution data structure in response to the addition of the new network path or the removal of an existing network path from the aggregation group.

In some examples, the identifying of the selected entries of the distribution data structure to skip includes identifying a number of the selected entries to skip based on a difference between a first number of entries of the distribution data structure mapped to a respective network path prior to the addition or the removal, and a second number of entries of the distribution data structure mapped to the respective network path after the addition or the removal. More specifically, according to some examples, for each respective network path of the multiple network paths that make up an aggregation group, the distribution data structure updating instructions 204 may be executed to compute a respective difference value representing a first number of entries of the distribution data structure mapped to the respective network path prior to the addition or the removal, and a second number of entries of the distribution data structure mapped to the respective network path after the addition or the removal. A difference value is based on a difference between the first number of entries of the distribution data structure mapped to the respective network path prior to the addition or the removal, and the second number of entries of the distribution data structure mapped to the respective network path after the addition or the removal. The difference values may be used in identifying the selected entries of the distribution data structure to skip as part of the updating of the distribution data structure. Further details regarding the computation of the difference values is set forth in connection with FIGS. 5 and 6 (where the difference values are represented as Diff[ ]).

In some examples, in response to updating an entry of the distribution data structure as part of the updating for a given network path of the multiple network paths of the aggregation group, the distribution data structure updating instructions 204 may be executed to advance (decrement or increment) a given difference value for the given network path. The updated given difference value is stored in a storage medium, and is later used to decide whether or not to cease updating the distribution data structure for the given network path. In addition, the distribution data structure updating instructions 204 can cease updating the distribution data structure for the given network path responsive to the addition or the removal in response to a specified relationship of the given difference value with respect to a threshold (e.g., where the specified relationship can refer to a greater than relationship or a less than relationship or other relationship). By using difference values to decide whether or not to update the distribution data structure for a respective network path, the number of updates of entries of the distribution data structure that are updated can be reduced. Further details regarding how difference values are used to decide whether or not to update the distribution data structure are described in connection with FIGS. 5 and 6 (where the difference values are represented as Diff[ ]).

Figure 3:
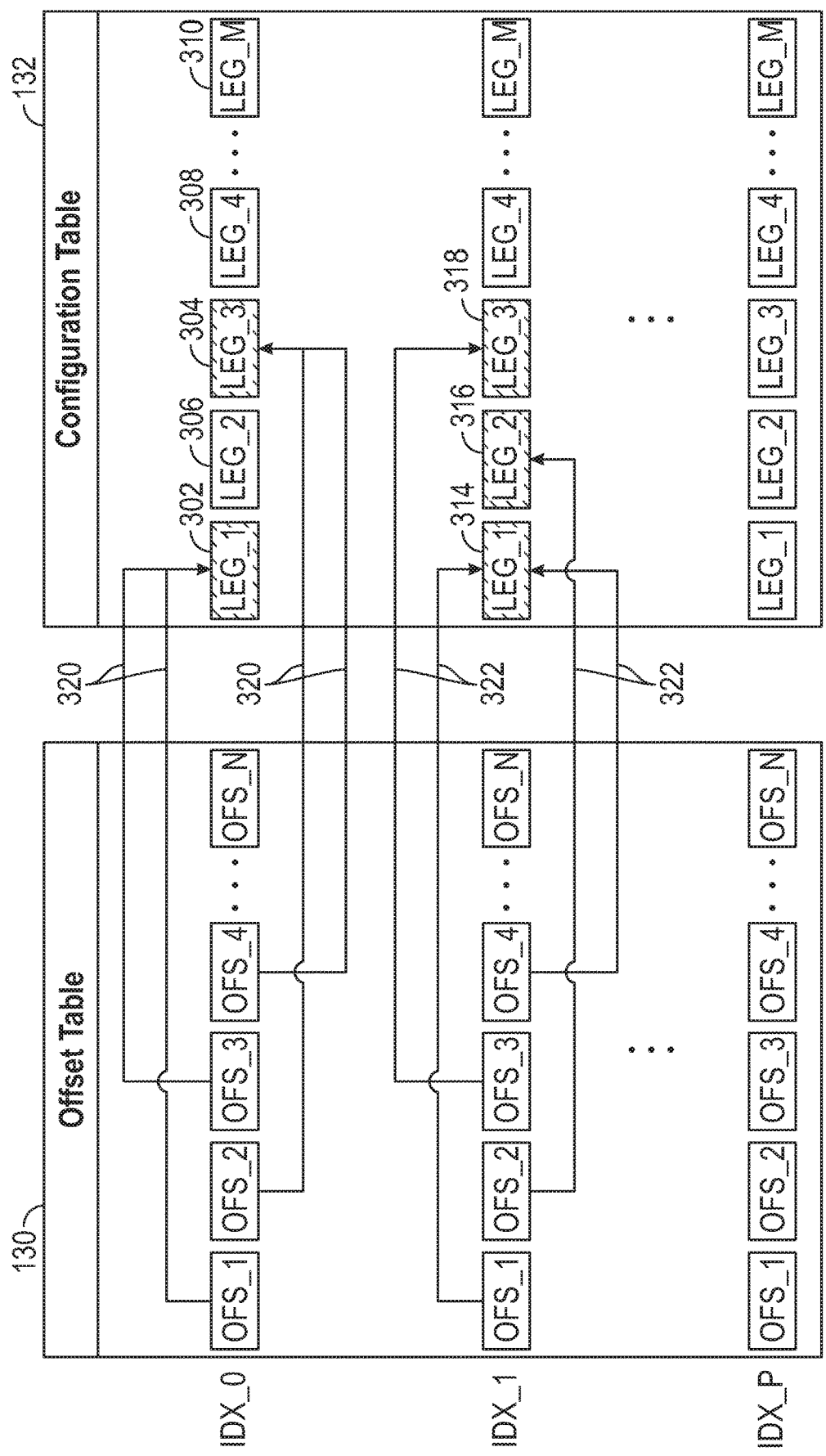
FIG. 3 is a block diagram of an offset table and a configuration table according to some examples.

FIG. 3 shows an example of the offset table 130 and the configuration table 132. The offset table 130 includes multiple rows. Similarly, the configuration table 132 includes multiple rows.

Each row of the offset table 130 corresponds to a respective aggregation group, and can be identified by a respective index. In FIG. 3, indexes IDX_0, IDX_1, and IDX_P identify respective different rows of the offset table 130, and correspond to respective different aggregation groups. Although three rows in the offset table 130 are shown in FIG. 3, it is noted that in different examples, the offset table 130 can include Q rows, where Q≥1.

The number of rows in the configuration table 132 is the same as the number of rows in the offset table 130. Each row of the configuration table 132 also corresponds to a respective aggregation group.

Each row of the offset table 130 includes a number of entries that contain respective pointers that reference corresponding entries of the respective row of the configuration table 132. In the example given in FIG. 3, the entries of the first row (identified by IDX_0) of the offset table 130 contain pointers 320 to respective entries of the first row of the configuration table 132.

In the first row of the configuration table 132 (referred to as the "first configuration table row"), the entries contain values representing respective different network paths of a first aggregation group. The shaded entries (302, 304) of the first configuration table row represent valid network paths that are defined for the first aggregation group. The non-shaded boxes (306, 308, 310) of the first configuration table row represent network paths that are not currently part of the first aggregation group (and thus are considered invalid network paths for the first aggregation group). The value in each entry of the first configuration table row (LEG_1 to LEG_M) represent respective network paths. For example, LEG_i (i=1 to M) can include an identifier of a network path, a port number of a port that is connected to the network path, and so forth.

Each row of the configuration table 132 includes M entries. Each row of the offset table 130 includes N entries. In some examples, N=64 and M=16. In other examples, N and M can have different values.

The pointers in the entries of the first row of the offset table 130 (referred to as the "first offset table row") point to respective entries of the first configuration table row that represent valid network paths of the first aggregation group. In other words, the pointers in the entries of the first offset table row each references either the shaded box 302 or 304 of the first configuration table row. Since there are just two valid network paths of the first aggregation group in the first configuration table row, the pointers in the entries of the first offset table row are divided between a first pointer value referencing the entry 302 and a second pointer value referencing the entry 304 of the first configuration table row. For example, N/2 pointers in the first offset table row reference the entry 302, while N/2 pointers in the first offset table row reference to the entry 304 of the first configuration table row, assuming N is evenly divisible by the number of network paths represented by the first configuration table row. In cases where N is not evenly divisible by the number of network paths represented by the first configuration table row, at least one entry of the first configuration table row would be referenced by one extra entry of the first offset table row. For example, if N=65, and there are two valid network paths, then 32 pointers in the first offset table row reference the entry 302, and 33 pointers in the first offset table row reference to the entry 304 of the first configuration table row (i.e., the entry 304 is referenced by one more entry of the first offset table than the entry 302).

In the second row of the configuration table 132, there are three entries 314, 316, and 318 that represent respective valid network paths of a second aggregation group. In this case, the pointers 322 in the entries of the second row of the offset table 130 (the row referenced by IDX_1) are divided among the three entries 314, 316, and 318.

FIG. 3 shows an example where the offset table 130 weighs the network paths equally (i.e., each network path is assumed to have the same bandwidth capacity or data rate or other characteristic for carrying data packets). In other examples, the offset table 130 can weigh different network paths unequally in distributing the communication of data packets across the network paths of the aggregation group. For example, one valid network path can have a greater bandwidth than another valid network path, so more entries of the offset table 130 should point to the valid network path with the greater bandwidth.

In operation, when a data packet is received by the switching engine 140 (FIG. 1), a hashing function is applied on certain field(s) of the data packet (e.g., a network address field and/or another field) and/or on other information, such as the port at which the data packet was received, a time at which the data packet was received, etc. to produce a reference (e.g., a pointer) to one of the entries of an offset table row. The pointer value in the referenced entry of the offset table row then references an entry of the configuration table 132 that represents a network path to which the data packet is to be transferred by the switching engine 140.

In an example, it is assumed that the first aggregation group represented by the first configuration table row (IDX_0) is updated to add a network path to the first aggregation group. In this case, one of the entries 306, 308, and 310 (that do not represent valid network paths of the aggregation group) can be updated by the distribution update logic 126 (FIG. 1) with network path information that represents the added network path so that it represents a valid network path. In the example, the entry 306 of the first configuration table row is updated to include the network path information of the added network path. As a result, some entries of the first offset table row are updated to reference the entry 306 of the first configuration table row that has been updated with the added network path information.

To avoid considering all of the entries of the first offset table row for update due to addition of the network path to the first aggregation group, the distribution update logic 126 (FIG. 1) according to some implementations can skip certain selected entries of the first offset table row for update, such that the number of entries of the first offset table row that are updated in response to the added network path is reduced (e.g., minimized).

FIGS. 4A-4E illustrate examples of how entries of a row of the offset table 130 are updated in response to addition and removal of network paths. FIG. 4A shows an initial state of the offset table row 400, assuming that there is just one network path in the aggregation group corresponding to the offset table row 400. It is assumed that there are 64 entries in the offset table row 400. The value "1" in each entry of the offset table row 400 in FIG. 4A is a pointer that references entry 1 (e.g., LEG_1) in the corresponding row of the configuration table 132.

FIG. 4B shows an update of the offset table row 400 in response to an addition of a network path to the aggregation group corresponding to the offset table row 400 (which results in the aggregation group having two network paths). As shown in FIG. 4B, half the entries of the offset table row 400 are updated with the pointer value "2" (bolded in FIG. 4B), which references another entry of the corresponding configuration table row (e.g., LEG_2). The update of the offset table row 400 performed by the distribution update logic 126 skips half the entries of the offset table row 400 for consideration in performing the update of the offset table row 400.

FIG. 4C shows the offset table row 400 updated in response to addition of a second network path to the aggregation group (which results in the aggregation group having three network paths). FIG. 4C shows that a number of entries of the offset table row 400 have been replaced with the pointer value "3" (bolded in FIG. 4C) that references another entry of the corresponding configuration table row (e.g., LEG_3). The update of the offset table row 400 performed by the distribution update logic 126 skips the non-bolded entries of the offset table row 400 in FIG. 4C for consideration in performing the update of the offset table row 400 in response to the addition of the second network path.

FIG. 4D shows an update of the offset table row 400 in response to addition of a third network path to the aggregation group (which results in the aggregation group having 4 network paths). As shown in FIG. 4D, a number of entries of the offset table row 400 have been replaced with the pointer value "4" (bolded in FIG. 4D) that references another entry of the corresponding configuration table row (e.g., LEG_4). The update of the offset table row 400 performed by the distribution update logic 126 skips the non-bolded entries of the offset table row 400 in FIG. 4D for consideration in performing the update of the offset table row 400 in response to the addition of the third network path.

As shown in each of FIGS. 4B-4D, in response to the addition of a new network path, a maximum number of entries of the offset table row 400 remain unchanged based on application of a technique used by the distribution update logic 126 of FIG. 1 described in herein. This avoids the transfer of a data communication flow for the network paths for which the entries of the offset table row 400 have not been changed.

FIG. 4E shows an example where a network path has been removed from the aggregation group (after the state shown in FIG. 4D), to result in the aggregation group having three network paths. In the example shown in FIG. 4E, the pointer value "4" in the offset table row 400 shown in FIG. 4D in some entries is replaced with corresponding different pointer values selected from "1," "2," and "3" (the replaced values are bolded in FIG. 4E). The update of the offset table row 400 performed by the distribution update logic 126 skips the non-bolded entries of the offset table row 400 in FIG. 4E for consideration in performing the update of the offset table row 400 in response to the removal of a network path.

FIGS. 4A-4E show examples where the population of entries of the offset table 130 contains respective pointers. In further examples, prior to writing a pointer to an entry of the offset table 130, the pointer is first scrambled. Scrambling a pointer can include any or a combination of: bit inverting a value of the pointer, encrypting or encoding the value of the pointer, applying a function on the value of the pointer, and so forth.

FIGS. 4A-4E show examples where the offset table 400 weighs the network paths equally. In other examples, the offset table 400 can weigh different network paths unequally in distributing the communication of data packets across the network paths of the aggregation group.

Figure 5:
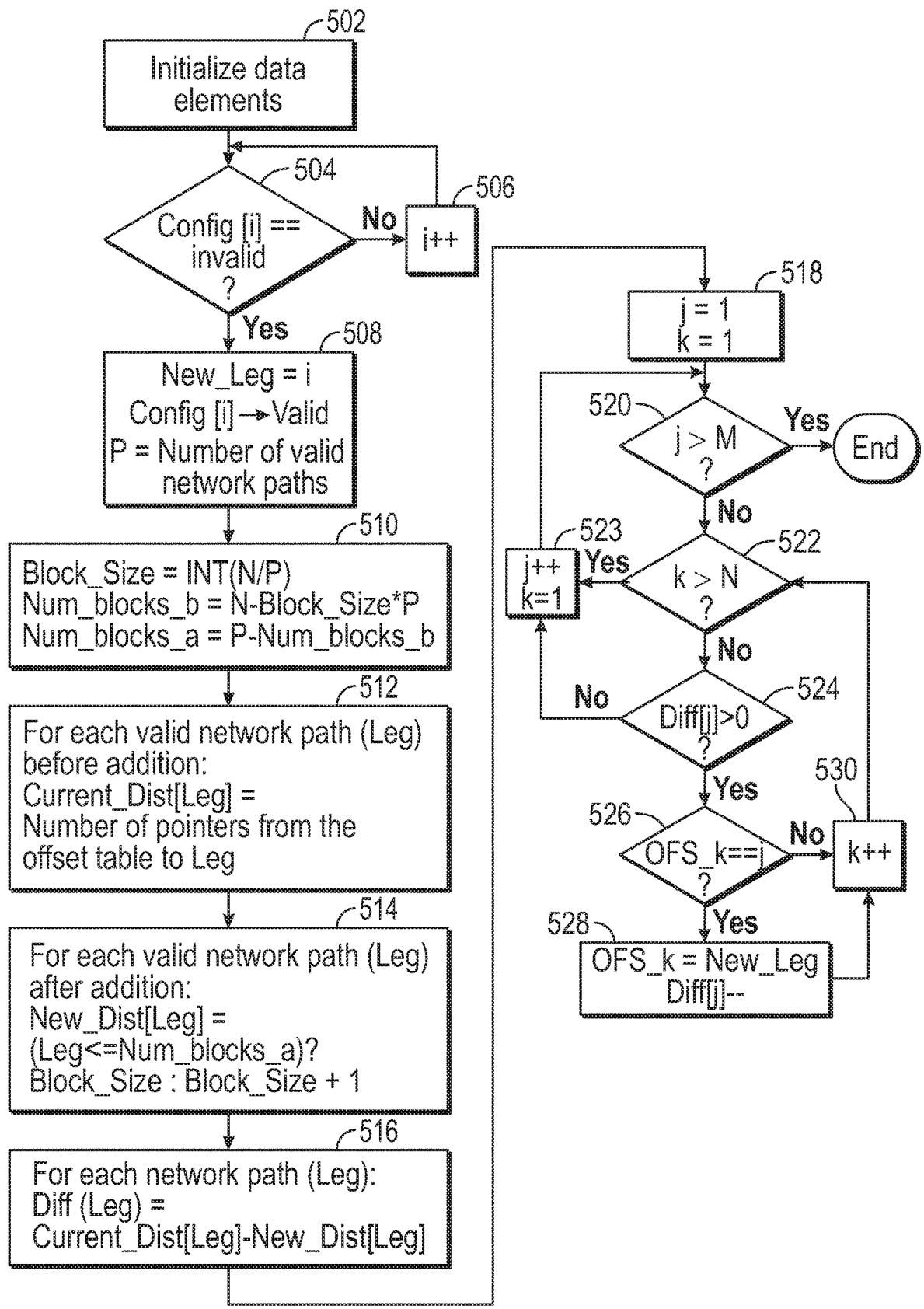
FIG. 5 is a flow diagram of a process to update entries of an offset table in response to adding a network path, according to some examples.

FIG. 5 is a flow diagram of a process 500 of updating the offset table 130 in response to adding a new network path to an aggregation group (referred to as the "aggregation group under consideration"), according to some examples. Although FIG. 5 shows a specific order of tasks, it is noted that in other examples, the tasks can be performed in a different order, and some of the tasks can be replaced with other tasks. In some examples, the process 500 may be performed by the distribution update logic 126 of the network path aggregation management engine 124 of FIG. 1. In some examples, the process 500 may be performed by executing the instructions of the storage medium 200 of FIG. 2.

Task 502: The process 500 initializes various data elements, including setting a vector Current_Dist[1 . . . M]={0}, a vector New_Dist[1 . . . M]={0}, a vector Diff[1 . . . M]={0}, and a counter i=1. Each of the Current_Dist[1 . . . M], New_Dist[1 . . . M], and Diff[1 . . . M] vectors has M values, where M is the number of entries in a row of the configuration table 132. The significance of these data elements is discussed further below.

Task 504: The process 500 determines whether Config[i], which is entry i of a configuration table row corresponding to the aggregation group under consideration, represents an invalid network path (i.e., a network path that is not currently part of the aggregation group). Config[i] can be set to a first value (e.g., "Invalid") to indicate that network path i is invalid, and to a second value (e.g., "Valid") to indicate that network path i is valid.

Task 506: If Config[i] does not represent an invalid network path, the value of i is incremented, and the process 500 returns to task 504.

Task 508: If Config[i] does represent an invalid network path, then the new network path (referred to as New_Leg in FIG. 5) is set as network path i. Also, Config[i] is set to the second value (e.g., "Valid") to indicate that Config[i] represents a valid network path (i.e., a network path that is part of the aggregation group under consideration). In addition, a parameter P is set to equal a count of a number of entries of the configuration table row corresponding to the aggregation group under consideration that represent valid network paths.

Task 510: The process 500 sets a parameter Block_Size equal to INT(N/P), where N is the number of entries of the corresponding offset table row. The value of the parameter Block_Size is set to the integer portion of N/P.

The process 500 sets Num_blocks_b=N−Block_Size*P, and sets Num_blocks_a=P−Num_blocks_b. If N is not evenly divisible by P (i.e., N/P results in a remainder), then the parameter Num_blocks_a is set to a value that determines the number of valid network paths (after the addition of the new network path New_Leg) that are pointed to by the Block_Size number of entries of the offset table row, and Num_blocks_b is set to a value that determines the number of valid network paths that are pointed to by Block_Size+1 number of entries of the offset table row. Note that "valid" network paths can in some examples refer to entries of the configuration table 132 of FIG. 3. In other examples, the configuration table 132 may be sparse, i.e., some entries of the configuration table 132 may not represent valid network paths (e.g., entries 306, 308, and 310 in FIG. 3). In the latter examples, "valid" network paths refer to the network paths represented by entries of the configuration table 132 corresponding to valid network paths.

For example, if N=64 and P=3 (the number of valid network paths after the addition of the new network path), then Block_Size=INT(N/P)=INT(64/3)=21, Num_blocks_b=N−Block_Size*P=64−21*3=1, and Num_blocks_a=P−Num_blocks_a=3−1=2. In this example, two (Num_blocks_a) valid network paths are pointed to by 21 (Block_Size) entries of the offset table row, and one (Num_blocks_b) valid network path is pointed to by 22 (Block_Size+1) entries of the offset table row.

Task 512: For each valid network path (referred to as Leg) before adding the new network path (New_Leg), the process 500 sets the parameter Current_Dist[Leg] to the number of pointers from the offset table row to the network path, Leg.

Task 514: New_Dist[Leg] represents the number of pointers from the offset table row to the valid network path, Leg, after the new network path has been added. For each valid network path (Leg) (where Leg represents a current network path within a set of valid network paths, and not an index into the configuration table 132 in examples where some entries of the configuration table 132 do not represent valid network paths), the process 500 sets New_Dist[Leg]= (Leg<=Num_blocks_a ? Block_Size:Block_Size+1). This computation specifies that Num_blocks_a of the valid network legs are pointed to by Block_Size number of entries of the offset table row, while the remainder (Num_blocks_b) of the valid legs are pointed to by Block_Size+1 number of entries of the offset table row.

Task 516: For each network path (Leg), the process 500 computes Diff(Leg)=Current_Dist[Leg]−New_Dist[Leg], which is the difference in the number of entries of the offset table row pointing to the network path (Leg) prior to the addition of the new network path, and the number of entries of the offset table row pointing to the network path (Leg) after to the addition of the new network path.

As explained further below, the Diff(Leg) value (a difference value) is used to identify selected entries of the offset table row to skip for update in response to the addition of the new network path. Generally, if Diff(Leg) is equal to zero, then that indicates there is not a difference between the number of entries of the offset table row pointing to the network path (Leg) prior to the addition of the new network path, and the number of entries of the offset table row pointing to the network path (Leg) after to the addition of the new network path. In this condition, an offset table row entry would not be updated (i.e., the offset table row entry would be skipped when performing the update of the offset table row). Note that Diff(Leg) starts out positive or zero for each existing valid network path (Leg), and if positive, is decremented through the iterative process including tasks 520-528. Once Diff(Leg) reaches zero, further updates are skipped for the network path.

On the other hand, if Diff(Leg) is greater than zero, then that indicates there is a difference between the number of entries of the offset table row pointing to the network path (Leg) prior to the addition of the new network path, and the number of entries of the offset table row pointing to the network path (Leg) after to the addition of the new network path. In this latter condition, an offset table row entry would be updated.

Task 518: The process 500 initializes counters j=1 and k=1. The counter j is used to iterate through the number of entries (M) of the configuration table row, and the counter k is used to iterate through the number of entries (N) of the offset table row.

Generally, tasks 520-530 iterate through the entries of the configuration table row and the entries of the offset table row, and update an offset table row entry only if the difference value, Diff[ ], satisfies a specified condition (as represented by block 524).

Task 520: If the counter j is greater than M (the number of entries in the configuration table row), then the process 500 ends. If not, the process continues.

Task 522: If the counter k is greater than N (the number of entries in the offset table row), then the process 500 proceeds to task 523 to increment the counter j, and proceeds back to task 520. If the counter k is less than N, then the process 500 continues to task 524.

Task 524: If the difference value Diff[j] is not greater than zero, the process 500 does not update the current entry of the offset table row, represented as OFS_k in FIGS. 3 and 5. In this case, the process 500 continues to task 523 to increment the counter j and resets k=1. Note that for an invalid network path j or the new network path being added, Diff[j] is a negative number so would not be greater than zero.

However, if the difference value Diff[j] is greater than zero, the process 500 continues to task 526.

Task 526: The process 500 determines if OFS_k is equal to j (i.e., does the offset table row entry k contain a pointer to the configuration table row entry j). If not, the process 500 does not perform the update of the value of OFS_k, and proceeds to task 530 to increment the counter k, and then return to task 522. If OFS_k is equal to j, the process 500 continues to task 528.

Task 528: The process 500 updates OFS_k with a pointer to the new network path, New_Leg, and decrements Diff[j]. The process 500 then continues to task 530 to increment the counter k, and then return to task 522.

Figure 6:
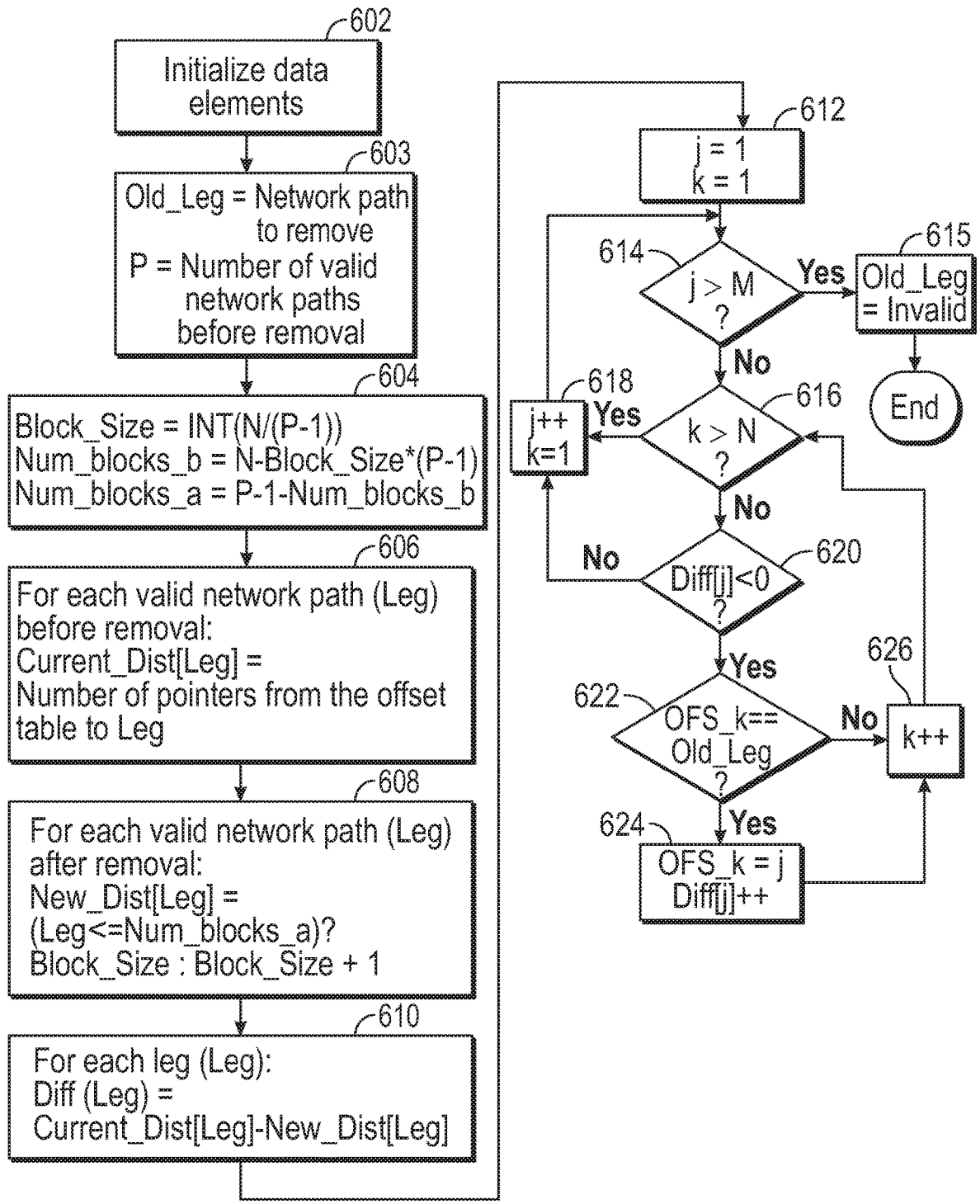
FIG. 6 is a flow diagram of a process to update entries of an offset table in response to removing a network path, according to some examples.

FIG. 6 is a flow diagram of a process 600 of updating the offset table 130 in response to removing an existing network path (Old_Leg) from an aggregation group (referred to as the "aggregation group under consideration"), according to some examples. Although FIG. 6 shows a specific order of tasks, it is noted that in other examples, the tasks can be performed in a different order, and some of the tasks can be replaced with other tasks. In some examples, the process 600 may be performed by the distribution update logic 126 of the network path aggregation management engine 124 of FIG. 1. In some examples, the process 600 may be performed by executing the instructions of the storage medium 200 of FIG. 2.

Task 602: The process 600 initializes various data elements, including setting a vector Current_Dist[1 . . . M]={0}, a vector New_Dist[1 . . . M]={0}, and a vector Diff[1 . . . M]={0}. Each of the foregoing vectors has a length of M.

Task 603: The process 600 sets Old_Leg as the network path to remove, and sets the parameter P equal to the number of valid network paths of the aggregation group prior to the removal of Old_Leg.

Task 604: The process 600 sets a parameter Block_Size equal to INT(N/(P−1)), where N is the number of entries of the corresponding offset table row. The value of the parameter Block_Size is set to the integer portion of N/(P−1). P−1 represents the number of valid network paths after removal of the network path (Old_Leg).

The process 600 sets Num_blocks_b=N−Block_Size*(P−1), and sets Num_blocks_a=P−1−Num_blocks_b. If N is not evenly divisible by P−1, then the parameter Num_blocks_a is set to a value that determines the number of valid network paths (after the removal of the existing network path Old_Leg) that are pointed to by the Block_Size number of entries of the offset table row, and Num_blocks_b is set to a value that determines the number of valid network paths that are pointed to by Block_Size+1 number of entries of the offset table row.

Task 606: For each valid network path (referred to as Leg) prior to removing the network path (Old_Leg), the process 600 sets the parameter Current_Dist[Leg] to the number of pointers from the offset table row to the network path, Leg.

Task 608: New_Dist[Leg] represents the number of pointers from the offset table row to the valid network path, Leg, after the network path (Old_Leg) has been removed. For each valid network path (Leg) (where Leg represents a current network path within a set of valid network paths), the process 600 sets New_Dist[Leg]=(Leg<=Num_blocks_a ? Block_Size:Block_Size+1). This computation specifies that Num_blocks_a of the valid network legs are pointed to by Block_Size number of entries of the offset table row, while the remainder (Num_blocks_b) of the valid legs are pointed to by Block_Size+1 number of entries of the offset table row.

Task 610: For each valid network path (Leg), the process 600 computes Diff(Leg)=Current_Dist[Leg]−New_Dist[Leg], which is the difference in the number of entries of the offset table row pointing to the network path (Leg) prior to the removal of the old network path (Old_Leg), and the number of entries of the offset table row pointing to the network path (Leg) after to the removal of the old network path.

As explained further below, the Diff(Leg) value (a difference value) is used to identify selected entries of the offset table row to skip for update in response to the removal of the old network path. Generally, if Diff(Leg) is equal to zero, then that indicates there is not a difference between the number of entries of the offset table row pointing to the network path (Leg) prior to the removal of the old network path, and the number of entries of the offset table row pointing to the network path (Leg) after to the removal of the old network path. In this condition, an offset table row entry would not be updated (i.e., the offset table row entry would be skipped when performing the update of the offset table row).

On the other hand, if Diff(Leg) is less than zero, then that indicates there is a difference between the number of entries of the offset table row pointing to the network path (Leg) prior to the removal of the old network path, and the number of entries of the offset table row pointing to the network path (Leg) after to the removal of the old network path. In this latter condition, an offset table row would be updated.

Task 612: The process 600 initializes counters j=1 and k=1. The counter j is used to iterate through the number of entries (M) of the configuration table row, and the counter k is used to iterate through the number of entries (N) of the offset table row.

Generally, tasks 614-626 iterate through the entries of the configuration table row and the entries of the offset table row, and update an offset table row entry only if the difference value, Diff[ ], satisfies a specified condition (as represented by block 620).

Task 614: If the counter j is greater than M (the number of entries in the configuration table row), then the process 600 proceeds to task 615 to set the state of the old network path (Old_Leg) to "Invalid." The process then ends. If the counter j is not greater than or equal to M, the process continues to task 616.

Task 616: If the counter k is greater than N (the number of entries in the offset table row), then the process 500 proceeds to task 618 to increment the counter j and reset k=1, and proceeds back to task 520. If the counter k is less than N, then the process 500 continues to task 620.

Task 620: If the difference value Diff[j] is not less than zero, the process 600 does not update the current entry of the offset table row, represented as OFS_k in FIGS. 3 and 6. In this case, the process 600 continues to task 618 to increment the counter j.

However, if the difference value Diff[j] is less than zero, the process 600 continues to task 622.

Task 622: The process 600 determines if OFS_k is equal to Old_Leg (i.e., does the offset table row entry k contain a pointer to the configuration table row entry representing Old_Leg). If not, the process 600 does not perform the update of the value of OFS_k, and proceeds to task 626 to increment the counter k, and then return to task 616. If OFS_k is equal to Old_Leg, the process 600 continues to task 624.

Task 624: The process 600 updates OFS_k with a pointer to the current value of the counter j, and increments Diff[j]. The process 600 then continues to task 626 to increment the counter k, and then return to task 616.

FIGS. 5 and 6 show example processes where the offset table 130 weighs the network paths equally. In other examples, the offset table 130 can weigh different network paths unequally in distributing the communication of data packets across the network paths of the aggregation group.

Figure 7:
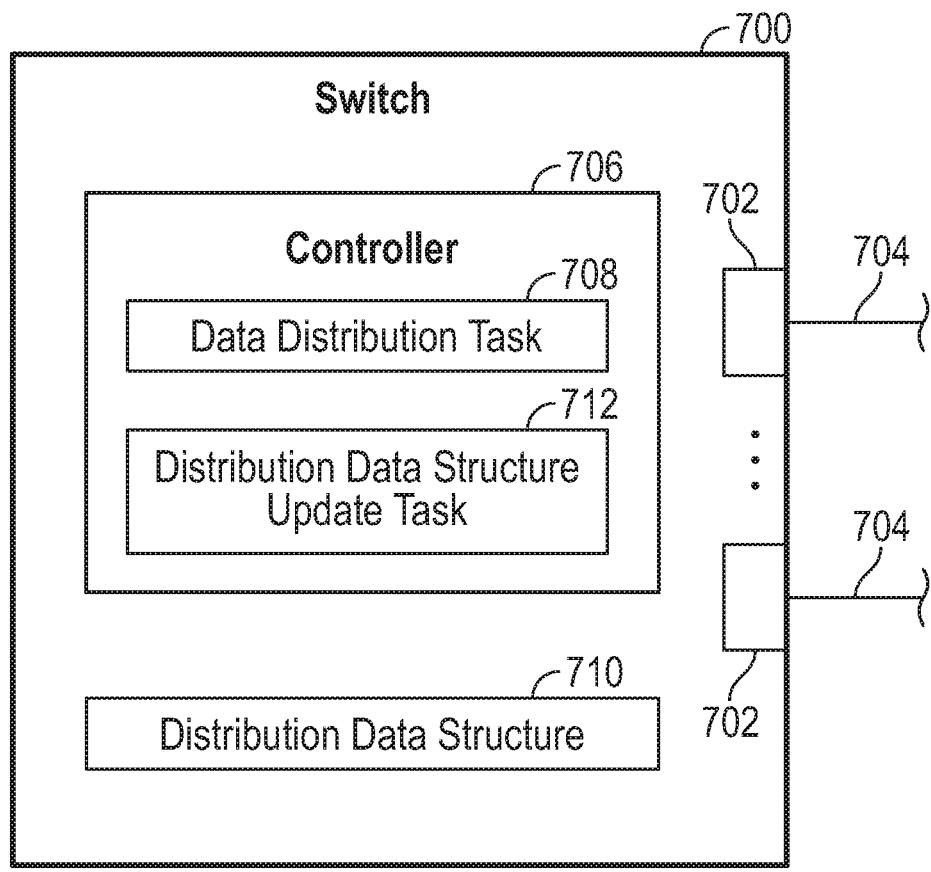
FIG. 7 is a block diagram of a switch according to some examples.

FIG. 7 is a block diagram of a switch 700 including a plurality of ports 702 to connect to a plurality of network paths 704. The switch 700 further includes a controller 706 to perform various tasks. A "controller" can refer to a hardware processing circuit, which can include any or some combination of a microprocessor, a core of a multi-core microprocessor, a microcontroller, a programmable integrated circuit (e.g., an application specific integrated circuit or ASIC), a programmable gate array, a digital signal processor, or another hardware processing circuit. Alternatively, a "controller" can refer to a combination of a hardware processing circuit and machine-readable instructions (software and/or firmware) executable on the hardware processing circuit.

Although FIG. 7 shows the controller 706 as being part of the switch 700, it is noted that in other examples, the controller 706 can be separate from the switch 700.

The tasks of the controller 706 include a data packet distribution task 708 that uses a distribution data structure 710 in distributing communications of data packets across the plurality of network paths 704.

The tasks of the controller 706 further include a distribution data structure update task 712 to update entries of the distribution data structure 710. Responsive to an addition of a new network path or a removal of an existing network path for the switch, the distribution data structure update task 712 identifies selected entries of the distribution data structure to skip, and updates entries of the distribution data structure, where the selected entries are skipped in the updating. In some examples, the update of the entries of the distribution data structure that includes skipping the selected entries avoids rebalancing all entries of the distribution data structure responsive to the addition or the deletion.

In some examples, updated entries of the distribution data structure 710 responsive to the addition or the deletion can be determined by the controller 706.

In other examples, updated entries of the distribution data structure 710 responsive to the addition or the deletion can be received from a remote controller (separate from the switch 700), with the controller 706 of the switch 700 writing the received updated entries to the distribution data structure 710.

Figure 8:
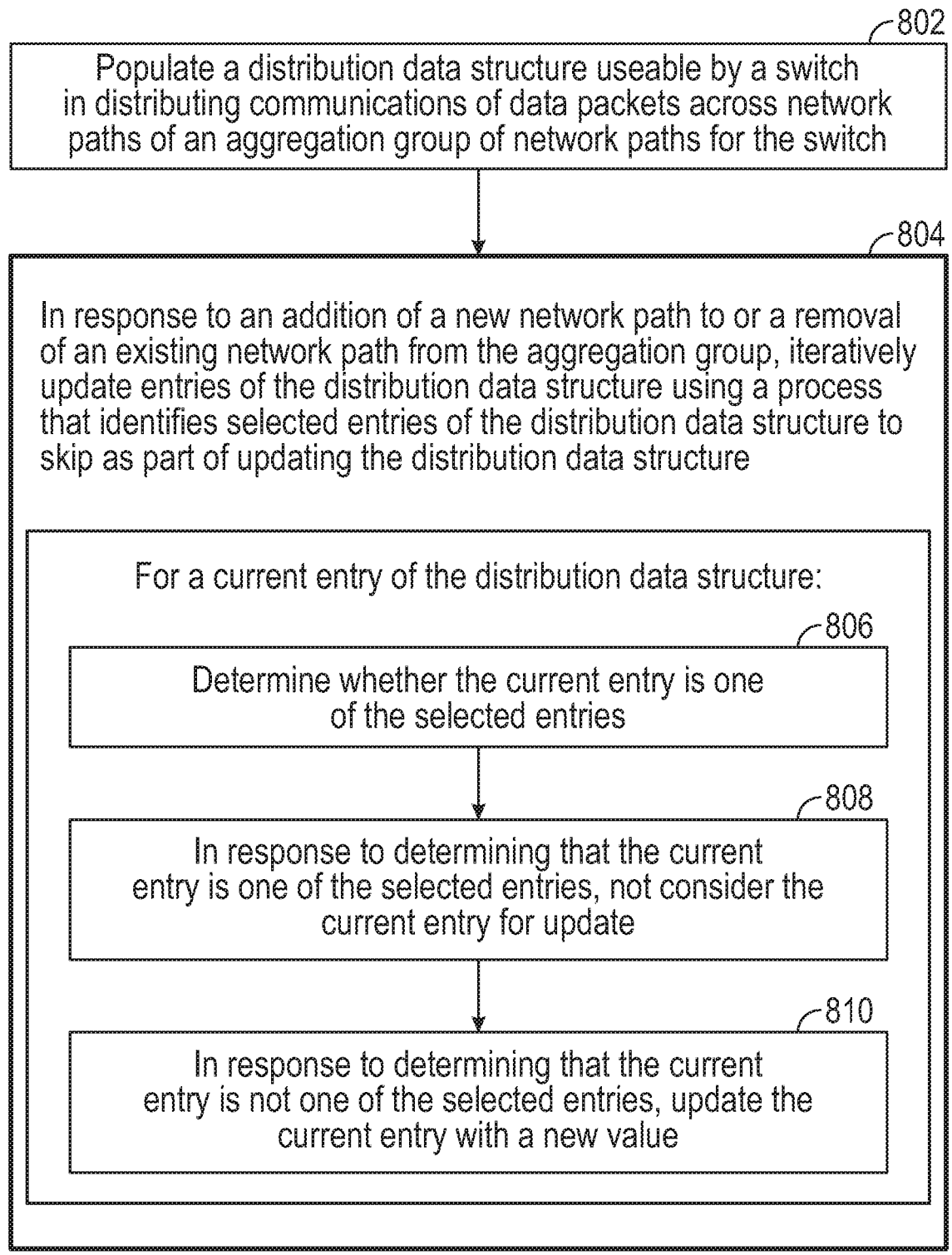
FIG. 8 is a flow diagram of a process according to further examples.

FIG. 8 is a flow diagram of a process performed by a system comprising a hardware processor (e.g., where the system can be a switch or a controller separate from the switch). A hardware processor can include a microprocessor, a core of a multi-core microprocessor, a microcontroller, a programmable integrated circuit (e.g., an ASIC, etc.), a programmable gate array (e.g., an FPGA, etc.), a digital signal processor, or another hardware processing circuit.

The process of FIG. 8 includes populating (at 802) a distribution data structure useable by a switch in distributing communications of data packets across network paths of an aggregation group of network paths for the switch.

The process of FIG. 8 further includes, in response to an addition of a new network path to or a removal of an existing network path from the aggregation group, iteratively updating (at 804) entries of the distribution data structure using a process that identifies selected entries of the distribution data structure to skip as part of updating the distribution data structure. The iterative updating includes, for a current entry of the distribution data structure (the "current entry" is the entry of the distribution data structure that is currently being processed): determining (at 806) whether the current entry is one of the selected entries; in response to determining that the current entry is one of the selected entries, not considering (at 808) the current entry for update; and in response to determining that the current entry is not one of the selected entries, updating (at 810) the current entry with a new value.

Iterative updating of the distribution data structure refers to an update process in which multiple update iterations are successively performed to consider entries of the distribution data structure for update, until a stopping criterion is satisfied. Each update iteration checks whether or not a respective current entry of the distribution data structure is to be updated, based on whether the current entry is one of the selected entries to skip (e.g., based on values of Diff[ ] in FIG. 5 or 6 for a corresponding network path). In some examples, the stopping criterion of the iterative updating is satisfied when all network paths have been considered.

The storage medium 200 of FIG. 2 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   populate a distribution data structure useable by a switch in distributing communications of data packets across a plurality of network paths for the switch; and
   in response to an addition of a new network path or a removal of an existing network path for the switch:
      for each respective network path of the plurality of network paths, compute a respective difference value representing a first number of entries of the distribution data structure mapped to the respective network path prior to the addition or the removal, and a second number of entries of the distribution data structure mapped to the respective network path after the addition or the removal;
      identify selected entries of the distribution data structure to skip based on the difference value, and
      update entries of the distribution data structure, wherein the selected entries are skipped in the updating.

2. The non-transitory machine-readable storage medium of claim 1, wherein the instructions upon execution cause the system to:
   not consider the identified selected entries of the distribution data structure for update when updating the distribution data structure in response to the addition or the removal.

3. The non-transitory machine-readable storage medium of claim 1, wherein the identifying of the selected entries of the distribution data structure to skip comprises identifying a number of the selected entries to skip based on a difference between a first number of entries of the distribution data structure mapped to a respective network path prior to the addition or the removal, and a second number of entries of the distribution data structure mapped to the respective network path after the addition or the removal.

4. The non-transitory machine-readable storage medium of claim 1, wherein the instructions upon execution cause the system to:
in response to updating an entry of the distribution data structure as part of the updating for a given network path of the plurality of network paths, advance a given difference value for the given network path; and
cease updating the distribution data structure for the given network path responsive to the addition or the removal in response to a specified relationship of the given difference value with respect to a threshold.

5. The non-transitory machine-readable storage medium of claim 1, wherein the distribution data structure includes a plurality of entries, wherein prior to the updating of the distribution data structure, each entry of the plurality of entries contains a pointer to a respective value that corresponds to a respective network path of the plurality of network paths, and
wherein after the updating of the distribution data structure, each entry of the plurality of entries contains a pointer to a respective value that corresponds to a respective network path of network paths that are present after the addition or the removal.

6. The non-transitory machine-readable storage medium of claim 1, wherein the values to which the pointers of the plurality of entries of the distribution data structure refer comprise values of another data structure including entries representing respective network paths for the switch.

7. The non-transitory machine-readable storage medium of claim 1, wherein the plurality of network paths comprise network paths of an aggregation group of network paths.

8. The non-transitory machine-readable storage medium of claim 1, wherein the distribution data structure weights the plurality of network paths equally or unequally in the distributing of communications of data packets across the plurality of network paths for the switch.

9. The non-transitory machine-readable storage medium of claim 1, wherein the distribution data structure includes a plurality of entries,
wherein each entry of the plurality of entries contains a pointer to a respective value that corresponds to a respective network path of the network paths for the switch, the pointer based on scrambling an initial pointer value derived from a data packet field.

10. The non-transitory machine-readable storage medium of claim 1, wherein the non-transitory machine-readable storage medium comprising the instructions are part of the switch or a controller remote from the switch.

11. A switch comprising:
a plurality of ports to connect to a plurality of network paths; and
a controller to:
use a distribution data structure in distributing communications of data packets across the plurality of network paths, wherein the distribution data structure comprises a first data structure with entries pointing to a second data structure; and
responsive to an addition of a new network path or a removal of an existing network path for the switch:
changing entries in the second data structure;
identify selected entries of the first data structure to skip,
update the entries of the first data structure to reflect the change in the second data structure, wherein the selected entries are skipped in the updating,
for each respective network path of the plurality of network paths, compute a respective difference value representing a first number of entries of the distribution data structure mapped to the respective network path prior to the addition or the removal, and a second number of entries of the distribution data structure mapped to the respective network path after the addition or the removal; and
use the difference values in identifying the selected entries of the distribution data structure to skip.

12. The switch of claim 11, wherein the plurality of network paths are part of an aggregation group.

13. The switch of claim 11, wherein the controller is to determine updated values for the entries of the first data structure responsive to the addition or the removal.

14. The switch of claim 11, wherein the controller is to receive, from a remote controller, updated values for the entries of the distribution data structure responsive to the addition or the removal.

15. The switch of claim 11, wherein the update of the entries of the distribution data structure that includes skipping the selected entries avoids rebalancing all entries of the distribution data structure responsive to the addition or the removal.

16. A method performed by a system comprising a hardware processor, comprising:
populating a distribution data structure useable by a switch in distributing communications of data packets across network paths of an aggregation group of network paths for the switch; and
in response to an addition of a new network path to or a removal of an existing network path from the aggregation group, iteratively updating entries of the distribution data structure using a process that identifies selected entries of the distribution data structure to skip as part of updating the distribution data structure, the iterative updating comprising, for a current entry of the distribution data structure:
for each respective network path of the aggregation group, computing a respective difference value representing a first number of entries of the distribution data structure mapped to the respective network path prior to the addition or the removal, and a second number of entries of the distribution data structure mapped to the respective network path after the addition or the removal
determining whether the current entry is one of the selected entries based on the difference value,
in response to determining that the current entry is one of the selected entries, not considering the current entry for update, and
in response to determining that the current entry is not one of the selected entries, updating the current entry with a new value.

17. The method of claim 16, wherein the distribution data structure includes a plurality of entries,
wherein prior to the updating of the distribution data structure, each entry of the plurality of entries contains a pointer to a respective value that corresponds to a respective network path of the aggregation group prior to change by the addition or the removal, and wherein after the updating of the distribution data structure, each entry of the plurality of entries contains a pointer to a respective value that corresponds to a respective network path of the aggregation group changed by the addition or the removal.

\* \* \* \* \*